UNITED STATES PATENT OFFICE.

CHARLES R. BRYSON, OF PITTSBURG, PENNSYLVANIA.

COMPOSITION OF ELEMENTS TO BE USED FOR THE MANUFACTURE OF AN IMPROVED QUALITY OF METAL.

952,069. Specification of Letters Patent. Patented Mar. 15, 1910.

No Drawing. Application filed April 5, 1909. Serial No. 487,927.

*To all whom it may concern:*

Be it known that I, CHARLES R. BRYSON, a citizen of the United States, residing at Pittsburg, in the county of Allegheny and State of Pennsylvania, have invented a new and useful Composition of Elements to be Used for the Manufacture of an Improved Quality of Metal, of which the following is a specification.

My composition consists of the following elements combined by weight in approximately the proportions stated, viz: chromium 6.00%, nickel 3.00%, tungsten .50%, silicon .30%, carbon .60%, iron 89.177%, phosphorus .014%, manganese .40%, sulfur .009%, vanadium trace.

These above mentioned elements are mixed, combined, and amalgamated, by the usual method as now used in the manufacture of crucible steel, as made at the present time, which will readily be apparent and understood by those skilled in the art.

By the use and application of the combined elements, as heretofore set forth, I claim to be able to produce an entirely new quality of metal that possesses certain properties and chemical advantages which render it valuable and adaptable in various branches of the steel industry, and involves a nature peculiarly fitted to perform certain functions not applicable or possible with any of the present well known metals. For example, it will possess the peculiar property of excessive hardness, combined with toughness, and capable of resisting abrasion when brought into repeated contact with white or red hot iron or steel. Also, having the peculiar property of not cracking or fracturing when at a red heat, and suddenly quenched in cold water. It furthermore possesses the property of non-deterioration when coming into repeated contact with white or red hot iron or steel.

The chromium is intended as a hardener, and, by itself, would render the finished product very brittle, when used in the proportion given. The nickel and tungsten both produce toughness in the metal, and the silicon likewise toughens, but at the same time appears to act as a binder, also to create malleability when the metal is being forged in a hot condition. The properties contained in the manganese are known to eliminate gases, and at the same time absorb oxygen in the molten metal, therefore the use in the amount stated, while the carbon it is believed gives to the finished product the valuable property of elasticity. The vanadium is considered as an accidental component of the iron which is used as the basis for the alloy, and it is believed to create additional toughness in the finished product. Both the sulfur and phosphorus are recognized by manufacturers of steel as a necessary evil, and I have therefore only specified said elements in order to limit these component parts to about the amount specified. These above described features will render my newly discovered metal especially adaptable for the manufacture of butt or lap weld or seamless tubing, which art necessitates the use of balls, bell-rings, and stretcher bars; adjuncts commonly used in the production of the several methods of making metal tubes.

The peculiar properties and chemical nature contained in the metal will serve to prolong its life and usefulness greatly beyond any similar known substance, and hence its adaptability to a multiplicity of uses and arts will be possible.

What I claim as new is:

The herein described composition of elements in about the proportions given, for producing a new quality of metal, consisting of chromium 6.00%; nickel, 3.00%; tungsten, .50%; silicon, .30%; carbon, .60%; iron, 89.177%; phosphorus, .014%; manganese, .40%; sulfur, .009%; and vanadium, a trace; substantially as described, and for the purpose set forth.

CHARLES R. BRYSON.

Witnesses:
H. W. STEVENSON,
BEATRICE FITZGERALD.